(12) United States Patent
Fujita (10) Patent No.: US 8,132,079 B2
(45) Date of Patent: Mar. 6, 2012

(54) RADIO COMMUNICATION APPARATUS

(75) Inventor: Takashi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/896,553

(22) Filed: Sep. 4, 2007

(65) Prior Publication Data

US 2008/0002713 A1 Jan. 3, 2008

Related U.S. Application Data

(63) Continuation of application No. PCT/JP2005/003717, filed on Mar. 4, 2005.

(51) Int. Cl.
*H03M 13/00* (2006.01)
(52) U.S. Cl. ........................ 714/776; 714/795
(58) Field of Classification Search .................. 714/776, 714/795; 370/310–344
See application file for complete search history.

(56) References Cited

U.S. PATENT DOCUMENTS

| | | | |
|---|---|---|---|
| 5,715,259 | A | 2/1998 | Lee et al. |
| 6,504,824 | B1 * | 1/2003 | Tanaka et al. ............. 370/252 |
| 6,928,289 | B1 * | 8/2005 | Cho et al. ............. 455/452.2 |
| 7,197,024 | B2 | 3/2007 | Huo |
| 2002/0141370 | A1 * | 10/2002 | Abrol et al. ............. 370/338 |
| 2003/0086385 | A1 * | 5/2003 | Kwon et al. ............. 370/320 |
| 2006/0146963 | A1 * | 7/2006 | Valadon ............. 375/341 |

FOREIGN PATENT DOCUMENTS

| | | |
|---|---|---|
| CA | 2 262 774 | 9/1999 |
| JP | 06164624 | 6/1994 |
| JP | 7170200 | 7/1995 |
| JP | 10022989 | 1/1998 |
| JP | 11-298534 | 10/1999 |
| JP | 2000-125004 | 4/2000 |
| JP | 2000-174806 | 6/2000 |
| JP | 2003-92600 | 3/2003 |
| JP | 2004-172772 | 6/2004 |

* cited by examiner

OTHER PUBLICATIONS

Notification of Reason for Rejection issued in JP dated Jul. 7, 2009 Application No. 2007-506920.

*Primary Examiner* — Sam Rizk
(74) *Attorney, Agent, or Firm* — Murphy & King, P.C.

(57) ABSTRACT

A radio communication apparatus is provided in Protocol Data Unit (PDU) transmission, in which the tail end (boundary) of a packet is detected based on the calculation result of an error detection calculation (Frame Check Sequence (FCS) calculation), without use of Length Indicator (LI) information. Preferably, to avoid incorrect detection, tail end presence/non-presence flag information is set in a header, and the above detection is decided to be valid when the flag information in the header part of PDU, storing the detected tail end, indicates the presence of the tail end.

6 Claims, 6 Drawing Sheets

FIG.1

Sequence Number : Sequence number
Length Indicator : Data length
E(Extension bit) : Identification bit of Data/Length indicator
PAD : Padding

FIG.2

UE : Mobile unit
RAN : Radio access network
BTS : Base station
RNC : Radio control apparatus
CN : Core network

FIG.3

Flag 1
QoS : RT/NRT
S1~2 : Non-presence/presence of a packet top in the data
F1~2 : Non-presence/presence of an FCS code in the data
P1~2 : Non-presence/presence of padding in the data
Extension(E) : indicating the next field is the flag or the data.
※ indicates when the internal data is divided into two areas.

Flag 2
S3~4 : Non-presence/presence of a packet top in the data
F3~4 : Non-presence/presence of an FCS code in the data
P3~4 : Non-presence/presence of padding in the data
K : Format of the present invention Y/N
Extension(E) : indicating the next field is the flag or the data.
※ indicates when the internal data is divided into four areas.

FIG.4

FIG.5 In case of the PDU data part divided into four / with sequence control

RADIO COMMUNICATION APPARATUS

CROSS REFERENCE TO RELATED APPLICATIONS

This application is a continuation of International Application No. PCT/JP2005/003717, filed on Mar. 4, 2005, now pending, herein incorporated by reference.

TECHNICAL FIELD

The present invention relates to a radio communication apparatus constituting a radio communication system, and preferably, a mobile unit and a base station constituting a radio communication system performing packet transmission.

BACKGROUND ARTS

Among third-generation mobile communication systems which are examples of radio communication systems, a W-CDMA (Wideband-Code Division Multiple Access) system is adopted. The radio interface in the W-CDMA system is constituted of protocol layers of physical layer (Layer 1), data link layer (Layer 2) and network layer (Layer 3), and Layer 2 (L2) is divided into sublayers of MAC (Media Access Control) and RLC (Radio Access Control). Data channel (DCH) allocation of a packet data in packet transmission is carried out in the L2 RLC sublayer, and the data format is defined in a 3GPP specification (TS25.322) as RLC SDU (Service Data unit).

In the above RLC SDU, there are a few PDU (Protocol Data Unit) formats according to transfer modes, being defined such as TrD PDU (Transparent Mode), UMD PDU (Unacknowledge Mode) and AMD PDU (Acknowledge Mode), among which header information, such as SN (Sequence Number) and LI (Length Indicator), is added in case of UMD PDU and AMD PDU.

Figure 1:
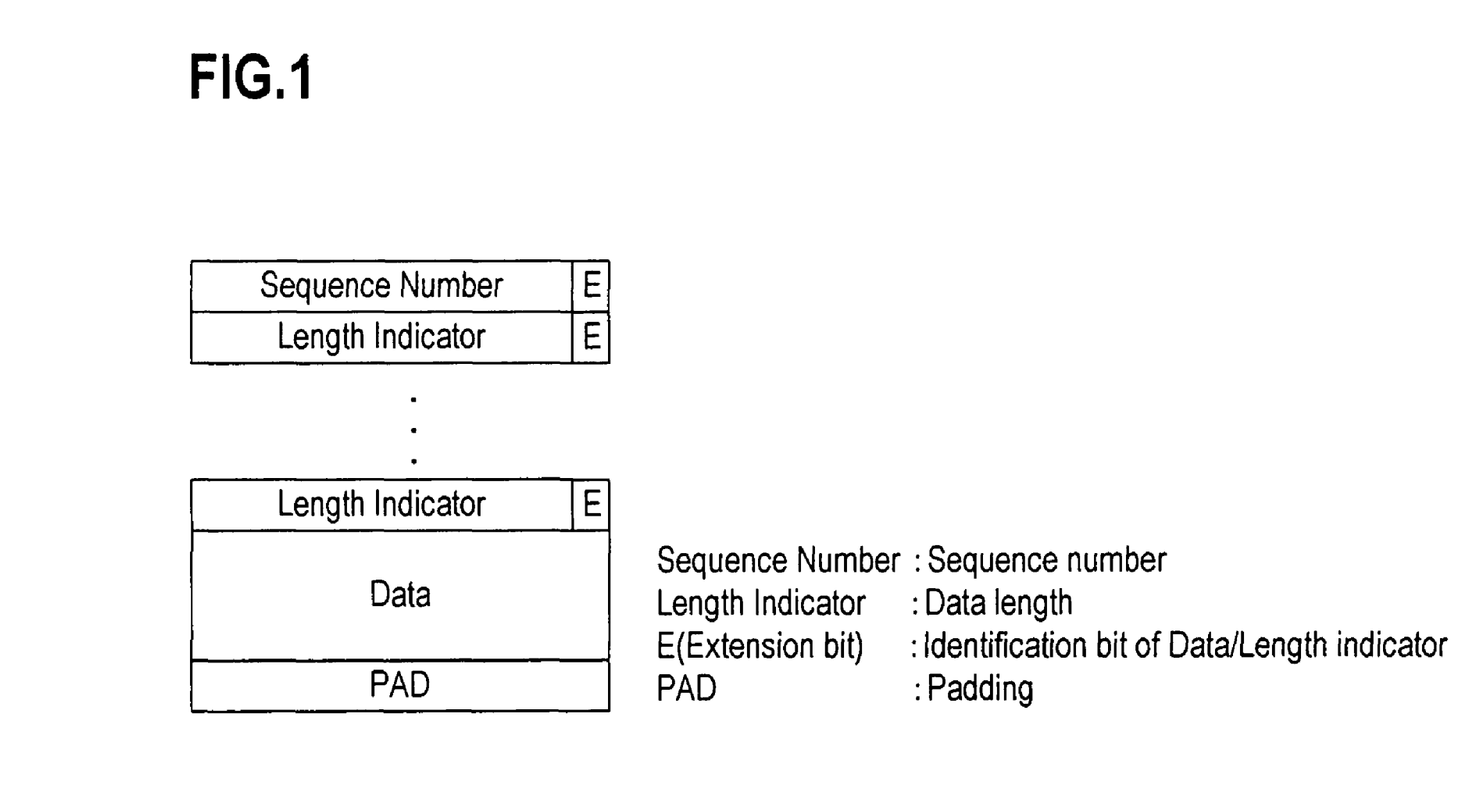
FIG. 1 shows a diagram illustrating a UMD PDU data format.

FIG. 1 shows a diagram illustrating the UMD PDU data format. The data format concerned includes a header part, including SN (Sequence Number) and LI (Length Indicator), and a data part. In the data part, data are stored and further, padding (PAD) may be added thereto.

The LI information in the header part is information for indicating the connection portion to a next packet (how many octets are present in the PDU before a breakpoint) when dividing a packet to fit to a PDU size at the time of transmitting the packet data by use of PDU, and the packet is divided across PDUs. Accordingly, when the packet is divided to fit to the PDU size, the LI information, which indicates the boundary position between the tail end of the packet concerned and the top of the next packet, is included in the header part of the PDU in which the tail end of the packet is stored. Further, there may also be a case that a plurality of sets of LI information are included in a single PDU when the packet length is shorter than the PDU size.

Additionally, in addition to the case of indicating the boundary position between packets, the LI information is also used when padding is added (the boundary position between the packet data and the padding) or when indicating such a PDU storage condition that the packet connection portion comes to the final PDU octets, and is specified as a special code.

Further, the Japanese Unexamined Patent Publication No. 2000-125004, No. 2003-92600 and the Japanese Patent Publication No. 11-298534 respectively relate to PDU transmission using a format having LI information.

Problems to be Solved by the Invention

In the above conventional system, the header provision method of UMD PDU and AMD PDU, depending on a PDU condition of storing packet data, the LI information occupies a plurality of octets, thus producing an increased header part. Then, because the PDU size is constant, the data part occupied in the PDU is reduced, causing a problem of degraded transmission efficiency. When the above PDU header part information is replaced by other means, it is possible to suppress the increase of a header length and simplify, allowing improved throughput in high-speed IP transmission.

Accordingly, it is an object of the present invention to enable recognition of the tail end (boundary) of a packet while reducing the header length.

Means to Solve the Problem

As a first configuration of a radio communication apparatus according to the present invention to achieve the aforementioned object, in the radio communication apparatus receiving a variable length packet data stored in the data part of a data unit having the data part and the header part, there are provided an error detection calculation section performing error detection calculation for the packet data, based on an error checking code included in the tail end portion of the packet data stored in a reception data unit; and a detection section detecting the tail end position of the packet data in the data unit having the tail end of the packet data, based on the calculation result of the error detection calculation.

As a second configuration of the radio communication apparatus according to the present invention, in the above first configuration, further, a decision section deciding the validity of the tail end position detected by the detection section is provided.

As a third configuration of the radio communication apparatus according to the present invention, in the above second configuration, the header part includes first flag information indicating whether or not the tail end of the packet data is present in the data part, and the decision section decides that the tail end position detected by the detection section is valid when the first flag information in the header part of the data unit, including the tail end position detected by the detection section, indicates the presence of the tail end.

As a fourth configuration of the radio communication apparatus according to the present invention, in the above second configuration, the header part includes first flag information indicating whether or not the tail end of the packet data is present in the data part, and the error detection calculation section performs error detection calculation for a packet data to the packet data, and the decision section decides that the tail end position of the packet data detected by the detection section is valid, when the first flag information in the header part of the data unit, including the tail end position of the packet data detected by the detection section, indicates the presence of the tail end, and when the detection section detects the tail end position of the next packet data in another data unit having the tail end of the next packet data, and the first flag information in the header part of the other data unit, having the tail end position of the next packet data, indicates the presence of the tail end.

As a fifth configuration of the radio communication apparatus according to the present invention, in either the above third or fourth configuration, the data part is sectioned into a plurality of areas, and the header part includes the first flag information for each area, and the decision section decides the validity of the tail end position, based on the first flag information corresponding to the area which the tail end position belongs to.

As a sixth configuration of the radio communication apparatus according to the present invention, in the above second configuration, the header part includes first flag information, indicating whether or not the tail end of the packet data is present in the data part, and second flag information, indicating whether or not padding is included in the data part, and the decision section decides that the tail end position detected by the detection section is valid, when the first flag information in the header part of the data unit, including the tail end position detected by the detection section, indicates the presence of the tail end, and when the second flag information in the header part indicates the presence of padding.

As a seventh configuration of the radio communication apparatus according to the present invention, in the above sixth configuration, the data part is sectioned into a plurality of areas, and the header part includes the first flag information and the second flag information for each area, and the decision section decides the validity of the tail end position, based on the first flag information and the second flag information corresponding to the area in which the tail end position is present.

As an eighth configuration of the radio communication apparatus according to the present invention, in either one of the above first to seventh configurations, further, a retransmission processing section performing retransmission processing of the packet data is provided, and the retransmission processing section identifies the sequence order of the data units successively received, according to the sequence information of the data units used in a control channel for the retransmission processing section.

As a ninth configuration of the radio communication apparatus according to the present invention, in the above eighth configuration, the header part includes third flag information indicating whether communication quality is real time or non-real time, and the retransmission processing section performs sequence control of the packet data stored in the data parts of the data units on a basis of each data unit successively received, based on the third flag information of the data units successively received.

As a tenth configuration of the radio communication apparatus according to the present invention, in the above eighth configuration, the header part includes third flag information indicating whether communication quality is real time or non-real time, for each area of the data part divided into the plurality of areas, and the retransmission processing section performs sequence control of the packet data stored in the data parts of the data units on an area-by-area basis of each data part of the data units successively received, based on the third flag information of the data units successively received.

As an eleventh configuration of the radio communication apparatus according to the present invention, in the radio communication apparatus transmitting a variable length packet data stored in the data part of a data unit having the data part and the header part, there are provided an error detection calculation section performing error detection calculation for the packet data in a normal data portion excluding the tail end portion of the packet data stored in a transmission data unit; and an insertion section inserting padding after the tail end of the packet data, based on the match result of the error detection calculation excluding an error checking code portion.

Effects of The Invention

According to the radio communication apparatus of the present invention, it is possible to recognize the tail end (boundary) of a packet while reducing a header length. Also, the data part can be elongated, enabling an improved transmission speed.

DESCRIPTION OF THE SYMBOLS

10: retransmission processing section, 11: header part/data part separation section, 12: data part memory, 13: header part memory, 14: header analysis section, 15: FCS calculation section, 16: FCS validity decision section, 17: buffer memory

DETAILED DESCRIPTION OF THE PREFERRED EMBODIMENTS

The preferred embodiment of the present invention is described hereinafter referring to the drawings. However, the following description of the embodiments is not intended to restrict the technical scope of the present invention.

Figure 2:
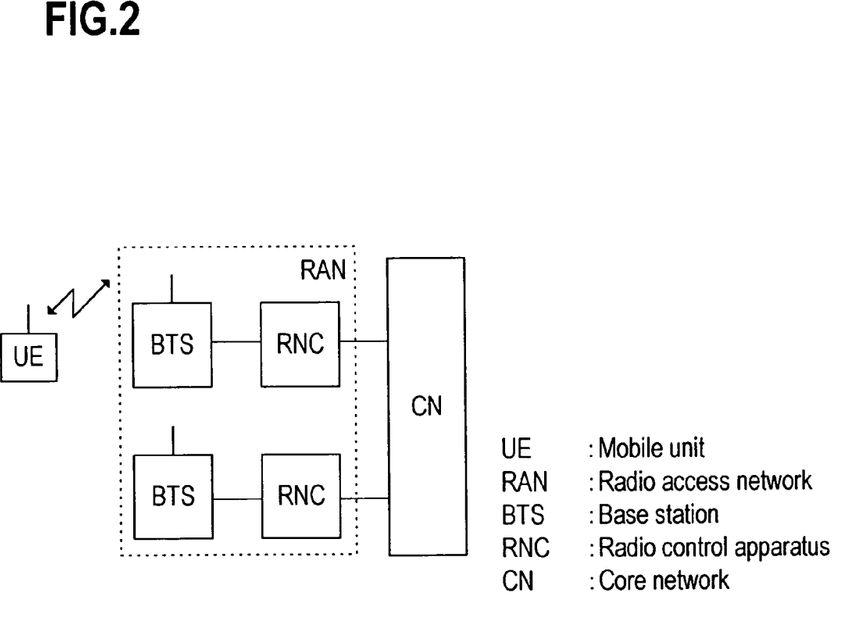
FIG. 2 shows a schematic configuration diagram of a radio communication system, including radio communication apparatus according to an embodiment of the present invention.

FIG. 2 shows a schematic configuration diagram of a radio communication system including radio communication apparatus according to an embodiment of the present invention. A mobile unit UE performs radio communication with a radio access network (RAN), and RAN is connected to a core network (CN). RAN includes a base station BTS and radio control apparatus RNC. The radio communication apparatus according to the present embodiment is apparatus for transmitting and receiving PDU format, such as mobile unit UE, base station BTS and radio control apparatus RNC in the radio communication system shown in FIG. 2. However, the radio communication apparatus is not limited to the above apparatus.

The radio communication apparatus according to the present embodiment recognizes the breakpoint of a packet data, using an error checking code attached to the tail end of the packet data. Typically, at the tail end of the packet, the error checking code (for example, CRC code) of a predetermined length (for example, 32 bits) is included. When a correct data is received, the result of the error detection calculation (CRC calculation) for the data before the error checking code matches the error checking code thereafter. Therefore, by detecting a match with the above error checking code, it is possible to recognize the tail end of the packet data (the boundary position between the packet data when a next packet data continues).

The error checking code in the W-CDMA communication protocol is a 32-bit CRC code called FCS (Frame Check Sequence). In the following description, FCS will be described as an example.

As such, by the use of FCS, which is an error checking code added to the tail end of the packet data, if the position at which the error detection calculation (FCS calculation) result matches the error check code is detected as the tail end of the packet data, it becomes unnecessary to set LI information into the header part, and thus, the increase of the header part, in other words, the reduction of data part, can be avoided. With this, the LI information in the header part of the conventional PD format can be omitted, and the data part can be elongated for that amount, and accordingly, the improvement of communication speed is realized.

Preferably, in order to avoid incorrect detection, it may also be possible to decide the tail end of the packet data by incorporating a validity decision method for deciding the validity to the calculation result of the FCS calculation. The reason is that there is a probability that the FCS calculation result may match the FCS in a position other than the tail end of the packet data, and also, there is a possibility that, when a normal FCS cannot be received due to a data error during communication, the FCS calculation result does not match the received FCS even in the tail end position of the packet data.

As one method for deciding the validity, there is set a FCS presence/non-presence flag (hereafter referred to as "F bit") indicating whether or not FCS is included in the header part of the PDU format. In case the F bit being set in the PDU format indicates no FCS presence, it is decided to be an incorrect detection (invalid) even granted that an FCS match is detected as a result of the FCS calculation for the data part of the format concerned. On the other hand, in case the F bit indicates FCS presence, and when an FCS match is detected as a result of the FCS calculation for the data part of the format concerned, it is decided to be valid (namely, the position in which the FCS match is detected is the tail end of the packet data).

Figure 3:
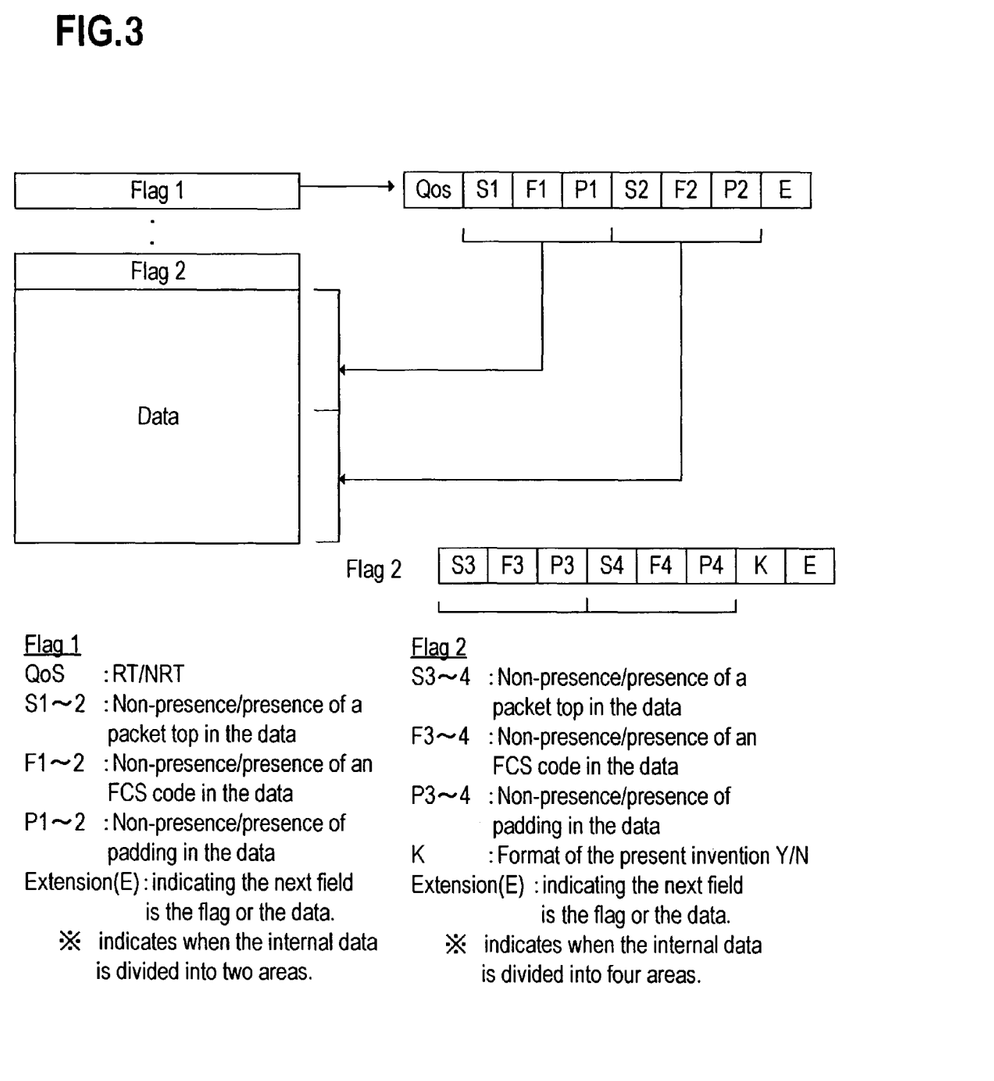
FIG. 3 shows a diagram illustrating an exemplary configuration of a PDU format according to an embodiment of the present invention.

FIG. 3 shows a diagram illustrating an exemplary configuration of the PDU format according to the embodiment of the present invention. In the format shown in FIG. 3, the header part is one octet written as Flag 1, having two F bits (F1, F2) therein. The reason for setting a plurality of F bits is as follows. Namely, the data part in the PDU format is arbitrarily divided into a plurality of areas, and each F bit, FCS presence/non-presence flag, is set for each divided area. By this, it is possible to set FCS positions on a subdivided basis, and the decision accuracy is improved further.

For example, the FCS presence/non-presence flag F1 shown in FIG. 3 is the F bit for the first half portion of the data part. Therefore, when the settings are no FCS presence in the flag F1 and FCS presence in the flag F2, even if the FCS calculation detects a match with FCS for the first half portion of the data part, it is possible to decide to be an incorrect detection.

Further, according to the format shown in FIG. 3, QoS bit, S bit, P bit and E bit are provided in addition to the F bit, FCS presence/non-presence flag. The S bit and the P bit have bits each provided for each of a multiplicity of areas dividing the data part, similarly to the F bit. In the QoS bit, packet data communication quality of RT (real time)/NRT (non-real time) can be set, and according to the setting thereof, sequence control processing in the order of sequence numbers (SE) can be performed. It may also be possible to set each QoS bit for each partial area of the data part, similarly to the F bit, the S bit and the P bit. By this, it becomes possible to cope with mixed RT/NRT transmission.

The S bit is a top presence/non-presence flag for identifying whether or not the top position of the packet data is included in the data part. Also, the P bit is a padding presence/non-presence flag for identifying whether or not padding (a blank) is included in the data part. Further, an E bit is a flag for identifying whether the next octet is the header part or the data part. In the example shown in FIG. 3, when the data part is divided into four areas, and the F bit, the S bit and the P bit are set for each area, the header part has a Flag 2 shown in the figure, in addition to the Flag 1, and the E bit in the Flag 1 has a value indicating the header part (flag).

Also, a K bit in the Flag 2 is a flag for identifying whether the header part has the format according to the embodiment of the present invention shown in FIG. 3 or the conventional format (for example, as shown in FIG. 1), and by setting the above K bit, it becomes possible to cope with both the new and the old formats.

Figure 4:
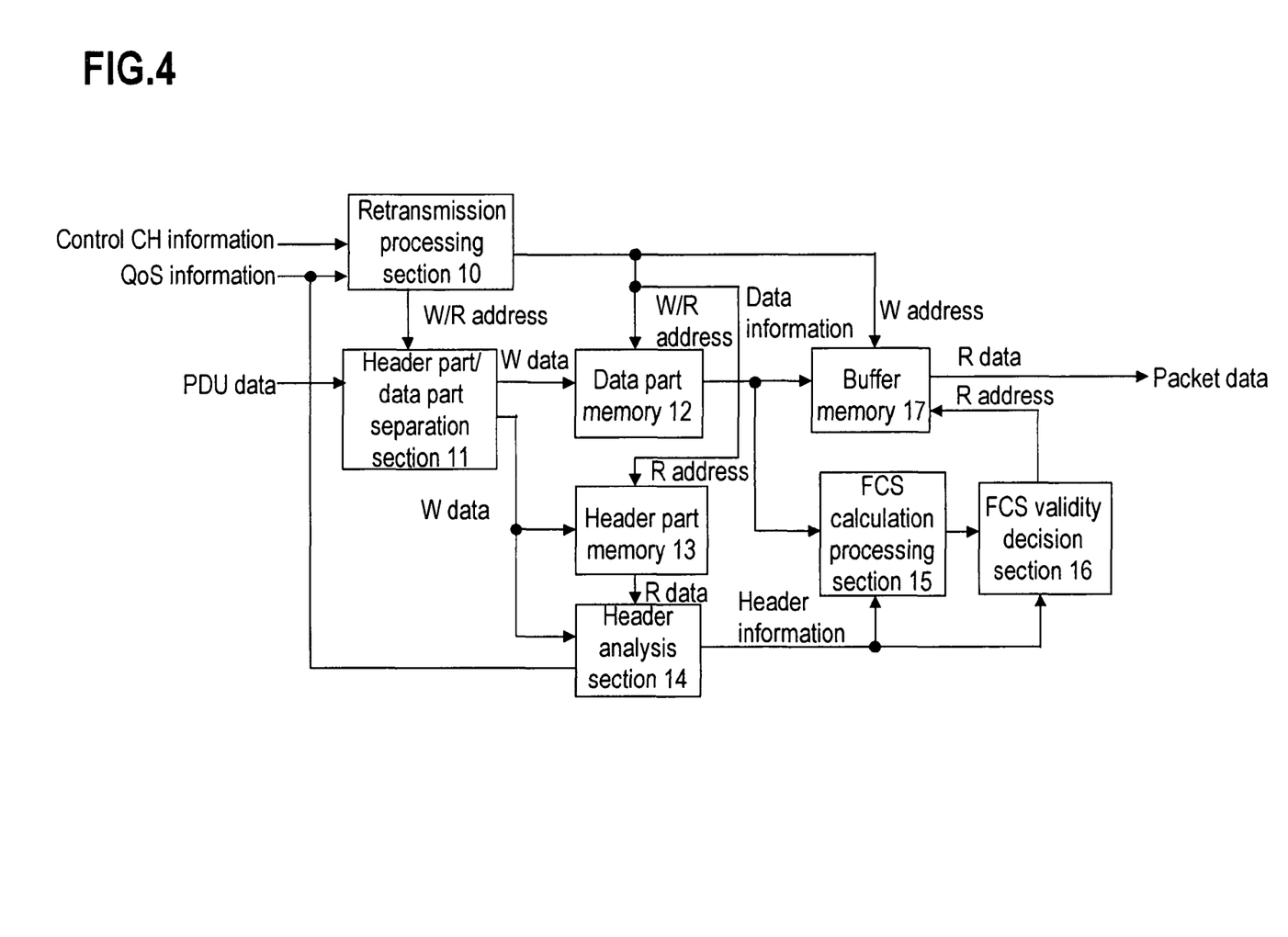
FIG. 4 shows a configuration block diagram of a radio communication apparatus according to a present embodiment.

FIG. 4 shows a configuration block diagram of a radio communication apparatus according to the present embodiment. A data having the PDU format including the header part shown in FIG. 3 is received, and the end of the packet data is detected based on the FCS calculation result.

A retransmission processing section 10 performs ARQ (Automatic Repeat Request) processing including hybrid ARQ (HARQ). Typically, a PDU number (information for identifying each PDU) in a control channel for retransmission processing, and QoS information in either the control channel or a PDU header part are extracted, and a write address and a read address to/from a data part memory 12 are generated and output. Also, retransmission processing section 10 includes a reception flag for each PDU number, decides the presence or non-presence of sequence control based on the QoS information, and processes a processable PDU.

As such, by identifying the sequence order of the received PDUs using the PDU number for retransmission in the control channel, it is also possible to eliminate SE (Sequence Number) having been set in the header part of the conventional PDU format, and to reduce the header part further, enabling the enlargement of the data part.

A header part/data part separation section 11 separates an input PDU into the header part and the data part. The data part is stored into data part memory 12, while the header part is stored in a header part memory 13. Further, the separated header part is also transmitted to a header analysis section 14. Data part memory 12 and header part memory 13 are ring buffers being mapped in the order of transmitted PDUs, so as to store the data part and the header part respectively, based on the write addresses from retransmission processing section 10, and to output the data part and the header part respectively, based on the read addresses from retransmission processing section 10.

Header analysis section 14 analyzes input header information, and transmits the QoS bit to retransmission processing section 10. Also, based on the F bit, the P bit and the S bit, it is analyzed whether FCS (packet data end position), padding and a packet data top position are included in the data part (on an area-by-area basis in case the data part is divided into a plurality of areas), and the above analysis result is transmitted to an FCS calculation section 15 and an FCS validity decision section 16, as enable signals.

Further, a buffer memory 17 is a buffer for temporarily retaining data being input from data part memory 12 during FCS calculation processing, which is written based on the write address from retransmission processing section 10, and outputs data on a basis of each MAC frame, based on the read address from FCS validity decision section 16.

FCS calculation processing section 15 continuously performs FCS calculation of the data being input from data part memory 12 on a bit-by-bit basis, and detects an FCS match as a calculation result. The position at which the FCS match is detected is a position which can be estimated as the tail end of the packet data, but because there is a possibility of incorrect detection, the validity of the detected FCS match is decided in FCS validity decision section 16, according to the present embodiment. FCS calculation processing section 15 counts the number of FCS calculation bytes, simultaneously with the calculation, and outputs the FCS calculation result and the calculation byte length to FCS validity decision section 16. FCS calculation processing section 15 includes a plurality of FCS calculation circuits, and the FCS calculation is performed by the plurality of FCS calculation circuits in parallel so as to continue the FCS calculation until the enable signal from header analysis section 14 is negated. A first FCS calculation circuit outputs an FCS match result of a first time, while a second FCS calculation circuit outputs an FCS match result of a second time (without outputting the FCS match result of the first time even when detected).

Also, when the sequence control is not performed (when QoS is RT), the assembled MAC frames are required to be output successively, and in case of reception with the sequence order being replaced, since it is not possible to discriminate which position in the PDU data part having the S bit is the top position of the packet data, FCS calculation processing section 15 includes FCS calculation circuits sufficient for the number of bytes (the number of octets) in the data part (when the data part is divided into a plurality of areas, the number of bytes in each area), and the FCS calculation is performed by shifting the bytes one by one. By this, it is possible to detect an FCS match in either of the FCS calculation circuits, even if the top of the packet data is located at any position in the data part.

FCS validity decision section 16 decides whether or not the FCS match detected in FCS calculation processing section 15 is valid. For example, when the FCS match is detected in the FCS calculation for the PDU data part having the F bit which indicates no FCS presence, it is decided to be an incorrect detection, and the detection is invalidated. Namely, the detection is not decided to be the tail end of the packet data. When a valid FCS match is detected and the tail end of the packet data is decided, a read address is generated and the data is output to buffer memory 17. An operation example of FCS validity decision section 16 will be described later in more detail.

Figure 5:
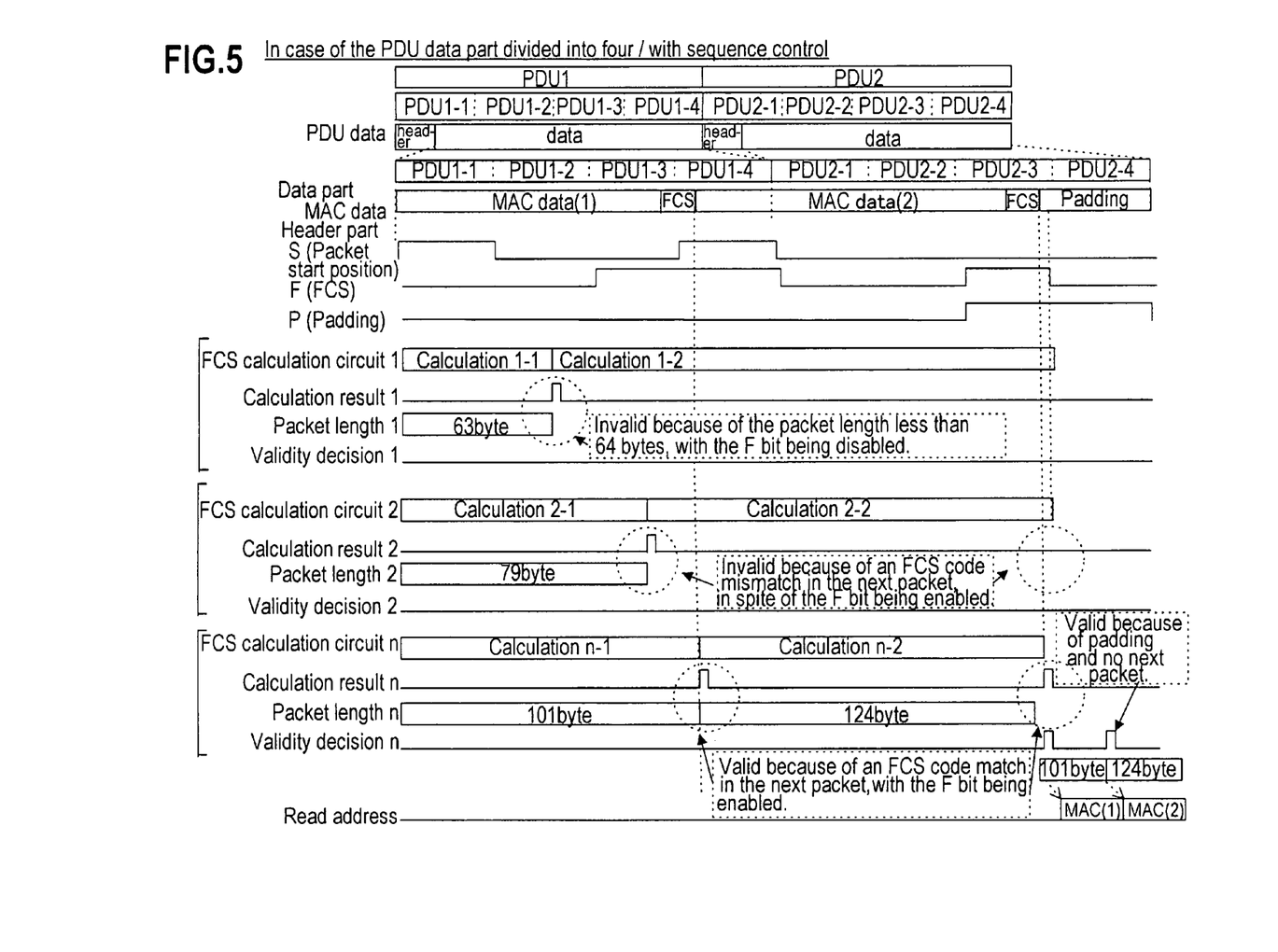
FIG. 5 shows a time chart illustrating a first operation example of a radio communication apparatus according to a present embodiment.

FIG. 5 shows a time chart illustrating a first operation example of a radio communication apparatus according to the present embodiment. In the first operation example, two MAC data (1), (2) are stored in both PDU1 and PDU2, and the second MAC data (2) extends across the two PDUS, PDU1, PDU2. Because processing can be performed from the top PDU due to the presence of sequence control, FCS calculation processing is executed from the top first byte. Further, the data part area in each PDU is divided into four. Namely, in FIG. 4, when receiving the two PDU1, PDU2, the data part in PDU1 is divided into four areas, PDU1-1, PDU1-2, PDU1-3 and PDU1-4, while the data part in PDU2 is divided into four areas, PDU2-1, PDU2-2, PDU2-3 and PDU2-4, and in the header part of each PDU, F bit, S bit and P bit are set on an area-by-area basis.

Now, the MAC data (1), which is a first packet data, exists in PDU1-1, PDU1-2 and PDU1-3, and the FCS for the MAC data (1) exists in PDU1-3 and PDU1-4. Therefore, in the header part of PDU1, the S bit is set on for PDU1-1, and the F bits are set on for PDU1-3 and PDU1-4. Also, the next MAC data (2) exists in PDU1-4, PDU2-1, PDU2-2 and PDU2-3, and the FCS for the MAC data (2) exists in PDU2-3. Further, padding exists in PDU2-3 and PDU2-4. Therefore, in the header part of PDU1, the S bit is set on for PDU1-4. Also, in the header part of PDU2, the F bit is set on for PDU2-3, and the P bits are set on for PDU2-3 and PDU2-4.

In case of sequence control presence, on receiving a PDU, a plurality of FCS calculation circuits simultaneously start calculation in parallel. In FIG. 5, an FCS calculation circuit 1 starts an FCS calculation from the start position of PDU1-1 (Calculation 1-1), and a FCS match is detected, as a first FCS match, at the position (in the area of PDU1-2) of a packet length of 63 bytes (Packet length 1) (Calculation result 1). However, in PDU2-2, since neither the FCS is present nor the F bit is set on, FCS validity decision section 16 decides that the calculation result of interest is incorrect detection (invalid) (Validity decision 1). Further, because there is no case that an FCS match is detected in a packet length shorter than the minimum packet length, 64 bytes, of the packet data, it is possible to decide to be incorrect detection from the above point. Further, because a next FCS calculation is performed from the position of the incorrect detection (Calculation 1-2), a correct FCS match is never detected thereafter.

An FCS calculation circuit 2 starts an FCS calculation from the start position of PDU1-1 (Calculation 2-1), and detects a second FCS match (Calculation result 2). The second FCS match is at the position (in the area of PDU1-3) of a packet length of 79 bytes (Packet length 2) from the start position of PDU1-1. Since the above position is not the end position of the FCS for the MAC data (1), Calculation result 2 is incorrect detection. However, because the F bit is set on for PDU1-3, FCS validity decision section 16 decides the above Calculation result 2 to be a candidate for a valid calculation result. Meanwhile, FCS calculation circuit 2 performs a next FCS calculation from the above detection position (Calculation 2-2), and tries to detect a next FCS match. However, because the next FCS calculation is performed from the incorrect detection position, the FCS match is not detected in the position where the next F bit is set on [in the area in which FCS for the MAC data (2) is present]. With this, FCS validity decision section 16 decides that Calculation result 2 is incorrect detection (invalid).

An FCS calculation circuit (n) starts an FCS calculation from the start position of PDU3-1 (Calculation n-1), and detects an n-th FCS match (Calculation result n). The n-th FCS match is at the position (in the area of PDU1-4) of a packet length of 101 bytes (Packet length n) from the start position of PDU1-1. Since the above position is the end position of the FCS for the MAC data (1), Calculation result n is correct detection. Because the F bit is set on for PDU1-4, FCS validity decision section 16 decides the above Calculation result n to be a candidate for a valid calculation result. Meanwhile, FCS calculation circuit n performs a next FCS calculation from the above detection position (Calculation n-2), and detects an FCS match in the area where the next F bit is set on (124 bytes ahead from the previous FCS match position). With this, FCS validity decision section 16 decides that the calculation result corresponding to Calculation n-1 is valid. As such, for the packet data successively received, when FCS matches are detected in succession, the detected tail end in regard to the packet data in the previous stage is decided to be valid.

Further, since the next of the FCS in the MAC data (2) is padding, the calculation result corresponding to Calculation n-2 is also decided to be valid. Namely, because of both the F bit and the P bit being set on, the decision is made to be valid. Then, the respective read addresses of the MAC data (1), (2) are generated.

Figure 6:
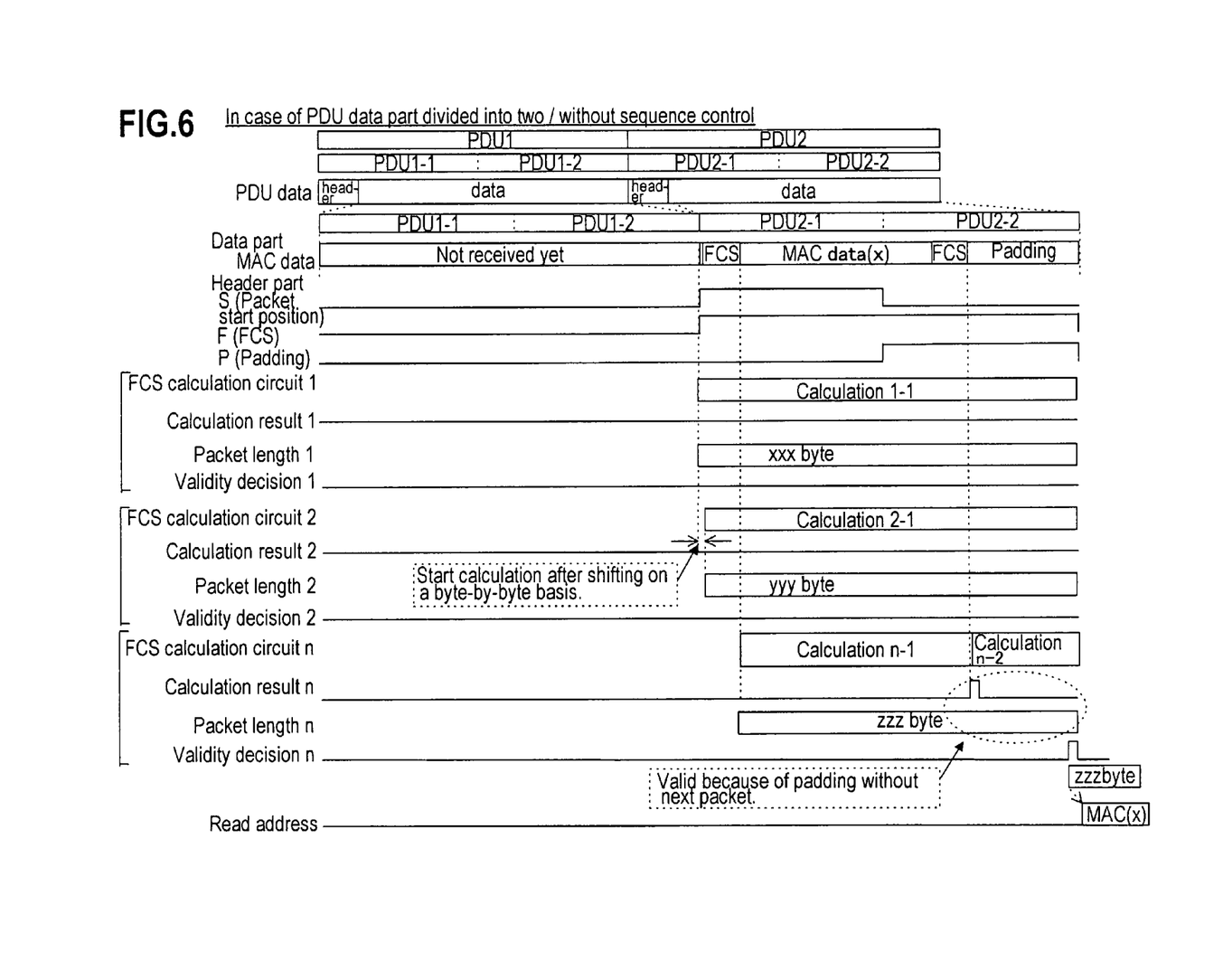
FIG. 6 shows a time chart illustrating a second operation example of a radio communication apparatus according to a present embodiment.

FIG. 6 shows a time chart illustrating a second operation example of a radio communication apparatus according to the present embodiment. The second operation example is a case that, similar to the above first example, MAC data is respectively stored in both PDU1 and PDU2, and PDU1 is not received yet, and one MAC data (x) is included in PDU2. Further, in the second operation example, because of no presence of sequence control, processing is started from PDU2 having the S bit set on. The data part area in each PDU is divided into two. Namely, in FIG. 6, when receiving the two PDU1, PDU2, the data part of PDU1 is divided into two areas, PDU1-1 and PDU1-2, while the data part of PDU2 is divided into two areas, PDU2-1 and PDU2-2, and in the header part of each PDU format, the F bit, the S bit and the P bit are set on an area-by-area basis.

In case of no presence of sequence control, the MAC data in PDU2 is processed earlier than the data in PDU1, but because the sequence order is replaced, it is not known which position in PDU2 is the top of the MAC (x) data. Therefore, in such the case, an FCS calculation is performed by shifting the bytes one by one in each FCS calculation circuit provided for the number of bytes in each area of the divided data part. Typically, an FCS calculation circuit 1 starts a calculation from the top position of PDU2 (Calculation 1-1), while an FCS calculation circuit 2 starts the calculation from the position shifted by one byte from the top position of PDU1 (Calculation 2-1), and an FCS calculation circuit n starts the calculation from the position shifted by n bytes from the top position of PDU (Calculation n-1). In the above case, each FCS calculation circuit detects a first FCS match from the start of calculation.

Because the calculation start position in each FCS calculation circuit 1, 2 is not the start position of the MAC data (x) in PDU2-1, an FCS match is not detected. Meanwhile, because FCS calculation circuit n has started the calculation from the start position of the MAC data (x) of PDU2-1, an FCS match is detected at the end of the FCS in the MAC data (x) (Calculation result n). FCS validity decision section 16 decides the above Calculation result n to be a candidate for a valid calculation result. Then, because the F bit is set on for PDU2-2, and also the P bit is set on, and the next to the FCS in the MAC data (x) is padding, FCS validity decision section 16 decides the calculation result of Calculation n-1 to be valid, and generates the read address of the MAC data (x).

The above embodiment is an operation example when the radio communication apparatus functions as reception apparatus, but when the radio communication apparatus functions as transmission apparatus, and at the time of generating PDU, it may be possible to generate and transmit PDU by inserting padding between contiguous packet data. By inserting padding between the packet data, it is possible to decide the validity of an FCS match by confirming that the F bit and the P bit in the PDU having the detected FCS match are set on.

Additionally, when padding is inserted frequently, the effect of header part reduction through the aforementioned method is faded away, and therefore, by checking the use condition of a transmission buffer, and when being not in a full state, it may be possible to insert padding for each packet data. In case of being in the full state, it may be possible to insert padding at a rate of once for a predetermined number of times, by counting the number of times when the tail end of the packet data comes to the last byte or the second byte from the tail end of the PDU data part, as an example. With this, it is possible to avoid incorrect detection with a small number of times of padding addition.

With the provision of FCS calculation circuit also in the radio transmission apparatus on the transmission side, it is also possible to clear the FCS calculation processing after the occurrence of the incorrect decision on the reception side, by confirming that an FCS match does not occur in a point other than the FCS code, and by forcibly inserting padding in case of the match.

Further, in packet transmission, because it is necessary to guarantee error-free transmission, the retransmission processing is performed as described above, but in a radio wave environment in which the CRC check in the layer 2 is passed because of a data error in radio communication, possibly the MAC data is transmitted with an error. In the present embodiment, when a packet data error is detected based on the FCS calculation result, it may also be possible to discard the packet data of interest, and issue a retransmission request to the transmission side.

INDUSTRIAL APPLICABILITY

By applying the present invention to radio communication apparatus capable of packet transmission, so as to shorten the data length in the header part of a data unit accommodating packet data, and to increase the allocation to the data part, the radio communication apparatus having an increased throughput can be realized.

What is claimed is:

1. A radio communication apparatus receiving a variable length packet data stored in the data part of a data unit having the data part and the header part, the radio communication apparatus comprising:
   an error detection calculation section performing error detection calculation for the packet data based on an error checking code included in the tail end portion of the packet data stored in a reception data unit;
   a detection section detecting the tail end position of the packet data in the data unit having the tail end of the packet data based on the calculation result of the error detection calculation; and
   a decision section deciding the validity of the tail end position detected by the detection section;
   wherein the header part comprises first flag information indicating whether or not the tail end of the packet data is present in the data part, and
   wherein the decision section decides that the tail end position detected by the detection section is valid, when the first flag information in the header part of the data unit, including the tail end position detected by the detection section, indicates the presence of the tail end.

2. The radio communication apparatus according to claim 1,
   wherein the data part is divided into a plurality of areas, and the header part comprises the first flag information for each area, and
   wherein the decision section decides the validity of the tail end position, based on the first flag information corresponding to the area which the tail end position belongs to.

3. A radio communication apparatus receiving a variable length packet data stored in the data part of a data unit having the data part and the header part, the radio communication apparatus comprising:
   an error detection calculation section performing error detection calculation for the packet data based on an error checking code included in the tail end portion of the packet data stored in a reception data unit;

a detection section detecting the tail end position of the packet data in the data unit having the tail end of the packet data based on the calculation result of the error detection calculation; and a decision section deciding the validity of the tail end position detected by the detection section;

wherein the header part comprises first flag information indicating whether or not the tail end of the packet data is present in the data part, and wherein the error detection calculation section performs error detection calculation for a packet data to the packet data, and wherein the decision section decides that the tail end position of the packet data detected by the detection section is valid, when the first flag information in the header part of the data unit, including the tail end position of the packet data detected by the detection section, indicates the presence of the tail end, and when the detection section detects the tail end position of the next packet data in another data unit having the tail end of the next packet data, and further the first flag information in the header part of the other data unit, having the tail end position of the next packet data, indicates the presence of the tail end.

4. A radio communication apparatus receiving a variable length packet data stored in the data part of a data unit having the data part and the header part, the radio communication apparatus comprising:

an error detection calculation section performing error detection calculation for the packet data based on an error checking code included in the tail end portion of the packet data stored in a reception data unit;

a detection section detecting the tail end position of the packet data in the data unit having the tail end of the packet data based on the calculation result of the error detection calculation; and a decision section deciding the validity of the tail end position detected by the detection section;

wherein the header part comprises first flag information, indicating whether or not the tail end of the packet data is present in the data part, and second flag information, indicating whether or not padding is included in the data part, and wherein the decision section decides that the tail end position detected by the detection section is valid, when the first flag information in the header part of the data unit, including the tail end position detected by the detection section, indicates the presence of the tail end, and when the second flag information in the header part indicates the presence of padding.

5. The radio communication apparatus according to claim 4, wherein the data part is divided into a plurality of areas, and the header part comprises the first flag information and the second flag information for each area, and wherein the decision section decides the validity of the tail end position, based on the first flag information and the second flag information corresponding to the area in which the tail end position is present.

6. A radio communication apparatus transmitting a variable length packet data stored in the data part of a data unit having the data part and the header part, the radio communication apparatus comprising:

an error detection calculation section performing error detection calculation for the packet data in a normal data portion excluding the tail end portion of the packet data stored in a transmission data unit; and an insertion section inserting padding after the tail end of the packet data based on the match result of the error detection calculation excluding an error checking code portion.

* * * * *